(12) United States Patent
Chen et al.

(10) Patent No.: US 11,367,203 B2
(45) Date of Patent: Jun. 21, 2022

(54) CROSS-SENSOR OBJECT-ATTRIBUTE ANALYSIS METHOD AND SYSTEM

(71) Applicant: QNAP SYSTEMS, INC., New Taipei (TW)

(72) Inventors: Kung-Han Chen, New Taipei (TW); Peng-Yan Sie, New Taipei (TW); Jian-Kai Wang, New Taipei (TW); Yun-Tao Chen, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 17/133,868

(22) Filed: Dec. 24, 2020

(65) Prior Publication Data

US 2022/0044426 A1 Feb. 10, 2022

(30) Foreign Application Priority Data

Aug. 10, 2020 (TW) ................. 109127117

(51) Int. Cl.
*G06T 7/292* (2017.01)
*H04N 7/18* (2006.01)
*G06T 7/246* (2017.01)

(52) U.S. Cl.
CPC .............. *G06T 7/292* (2017.01); *G06T 7/246* (2017.01); *H04N 7/181* (2013.01); *G06T 2207/10016* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| 2015/0116487 A1* | 4/2015 | Ptitsyn ............... H04N 5/23254 348/143 |
| 2021/0192748 A1* | 6/2021 | Morales Morales ... G06T 11/20 |

* cited by examiner

*Primary Examiner* — Delomia L Gilliard
(74) *Attorney, Agent, or Firm* — Guice Patents PLLC

(57) ABSTRACT

A cross-sensor object-attribute analysis method for detecting at least one object in a space by using cooperation of a plurality of image sensing devices, the method including: the image sensing devices sending raw data or attribute vector data of sensed multiple images to a main information processing device, where the raw data and attribute vector data all correspond to a time record; and the main information processing device generating one or more of the attribute vectors according to the raw data of each of the images and using each of the one or more of the attribute vectors to correspond to one of the at least one object, or the main information processing device directly using the attribute vector data to correspond to the at least one object.

20 Claims, 4 Drawing Sheets

CROSS-SENSOR OBJECT-ATTRIBUTE ANALYSIS METHOD AND SYSTEM

BACKGROUND OF THE INVENTION

Field of the Invention

The present invention relates to a method for detecting an attribute of an object in a space, and more particularly to a method for assigning an attribute to an object in a space using a cross-sensor collaborative detection scheme.

Description of the Related Art

In general buildings or stores, cameras are installed at the corners of the internal space, and multiple screens are set up in a monitoring room for a security guard to monitor the internal space of the building or the store, so that the security guard can respond to emergencies in the internal space in time.

However, general cameras installed in buildings or stores only display the captured images or the analysis results of the captured images on corresponding screens respectively, and do not have a collaborative processing function. Therefore, for the security guard responsible for monitoring the screens, it is not only difficult to stay focused for a long time when monitoring multiple screens at the same time, but also difficult to identify abnormal events or suspicious persons.

To solve the problems mentioned above, a novel object-attribute detection scheme in a space is urgently needed.

SUMMARY OF THE INVENTION

One objective of the present invention is to provide a cross-sensor object-attribute analysis method, which can cover a space in a partially overlapping manner by the images of a plurality of image sensing devices, and use an edge computing architecture to implement at least one AI module to process the images obtained at a same time point to determine the identity of at least one object in the space.

Another objective of the present invention is to provide a cross-sensor object-attribute analysis method, which can determine two different attribute vectors correspond to a same object when a difference value of the two different attribute vectors is less than a preset value.

Another objective of the present invention is to provide a cross-sensor object-attribute analysis method, which can quickly identify an object and track its trajectory by disposing a plurality of image sensing devices in a space and adopting the corresponding manner between the attribute vectors and the object proposed by the present invention.

Still another objective of the present invention is to provide a cross-sensor object-attribute analysis method, which can analyze the trajectory record of an object in a space to provide consumer information to assist the owner in making business decisions.

To achieve the above objectives, a cross-sensor object-attribute analysis method is proposed, which is applied in a space disposed with a plurality of image sensing devices to enable the image sensing devices to cooperatively detect at least one object, and is realized by an edge computing architecture, the edge computing architecture including a main information processing device and a plurality of information processing units respectively disposed in the image sensing devices, the method including:

the information processing units transmitting detected data to the main information processing device, the detected data being raw data of sensed multiple images of the image sensing devices or data of one or more attribute vectors generated by processing the raw data using an inference process, and the main information processing device using the one or more attribute vectors to correspond to the at least one object, where each of the image sensing devices has an image plane, and the raw data and each of the attribute vectors all correspond to a time record, the inference process including: performing an object recognition procedure on the raw data to define a bounding box for at least one of the at least one object; and using a first AI module to perform an attribute evaluation calculation on each of one or more of the bounding boxes to generate one or more of the attribute vectors corresponding to one or more of the objects appearing in one of the images at a time point; and the main information processing device performing the inference process on the raw data of the images provided by the information processing units to generate one or more of the attribute vectors, and using each of the attribute vectors to correspond to one of the at least one object, or the main information processing device directly using the one or more of the attribute vectors provided by the information processing units to correspond to the at least one subject.

In one embodiment, the information processing units have at least one hardware acceleration unit.

In one embodiment, the main information processing device uses a second AI module to determine a corresponding identity of one of the attribute vectors.

In one embodiment, the main information processing device uses one aforementioned corresponding identity to find corresponding ones of the attribute vectors detected by the image sensing devices at a plurality of time points to locate a trajectory of one of the at least one object in the space.

In one embodiment, the attribute vector includes information of a location of one of the at least one object in the space.

To achieve the above objectives, the present invention further proposes a cross-sensor object-attribute analysis system, which has an edge computing architecture to realize a cross-sensor object-attribute analysis method, the edge computing architecture including a main information processing device and a plurality of information processing units respectively disposed in the image sensing devices, and the method including:

the information processing units transmitting detected data to the main information processing device, the detected data being raw data of sensed multiple images of the image sensing devices or data of one or more attribute vectors generated by processing the raw data using an inference process, and the main information processing device using the one or more attribute vectors to correspond to the at least one object, where each of the image sensing devices has an image plane, and the raw data and each of the attribute vectors all correspond to a time record, the inference process including: performing an object recognition procedure on the raw data to define a bounding box for at least one of the at least one object; and using a first AI module to perform an attribute evaluation calculation on each of one or more of the bounding boxes to generate one or more of the attribute vectors corresponding to one or more of the objects appearing in one of the images at a time point; and the main information processing device performing the inference process on the raw data of the images provided by the information processing units to generate one or more of the attribute vectors, and using each of the attribute vectors to correspond to one of the at least one object, or the main information processing device directly using the one or more of the attribute vectors provided by the information processing units to correspond to the at least one object.

In one embodiment, the information processing units have at least one hardware acceleration unit.

In one embodiment, the main information processing device uses a second AI module to determine a corresponding identity of one of the attribute vectors.

In one embodiment, the main information processing device uses one aforementioned corresponding identity to find corresponding ones of the attribute vectors detected by the image sensing devices at a plurality of time points, and thereby locate a trajectory of one of the at least one object in the space.

In one embodiment, the attribute vector includes information of a location of one of the at least one object in the space.

In possible embodiments, the main information processing device can be a cloud server, a local server or a computer device.

In possible embodiments, the image sensing devices can communicate with the main information processing device in a wired or wireless manner.

DETAILED DESCRIPTION OF THE PREFERRED EMBODIMENTS

To make it easier for our examiner to understand the objective of the invention, its structure, innovative features, and performance, we use preferred embodiments together with the accompanying drawings for the detailed description of the invention.

The principle of the present invention lies in:

(1) Employ a plurality of image sensing devices in a space, and let the image plane of each of the image sensing devices correspond to a local area of a reference plane representing the space, and preferably let any two adjacent aforementioned local areas partially overlap;

(2) Use an edge computing architecture to perform an object frame definition process and an identification process on the raw data of the image planes to generate one or more attribute vectors, where the identification process uses a first AI module to process the object frame, and an aforementioned attribute vector can correspond to a single-attribute object or a composite-attribute object, for example: a man not wearing a backpack or a man wearing a backpack; and (3) Make each aforementioned attribute vector correspond to a time record, so that a second AI module can be used to perform a joint confirmation procedure on a plurality of the attribute vectors detected by the image sensing devices at a same time point to confirm the identity of at least one object.

With the principle mentioned above, the present invention can quickly define the identity of each object in a space and track its trajectory so as to provide consumer information to assist an owner of the space in making business decisions, where the consumer information can be derived by analyzing the trajectory record of each object in the space.

Figure 1:
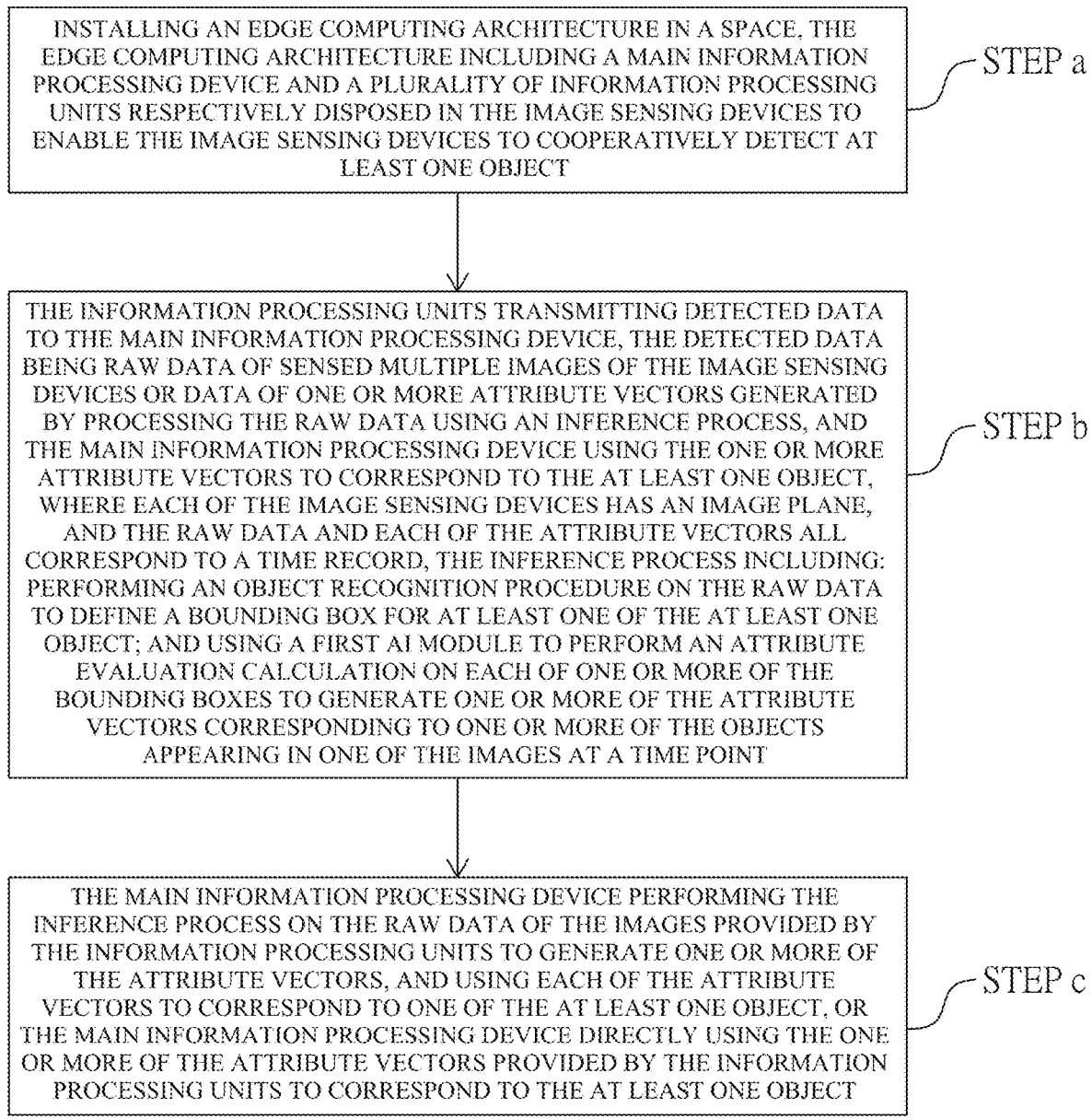
FIG. 1 illustrates a flowchart of an embodiment of a cross-sensor object-attribute analysis method of the present invention.
Figure 2:
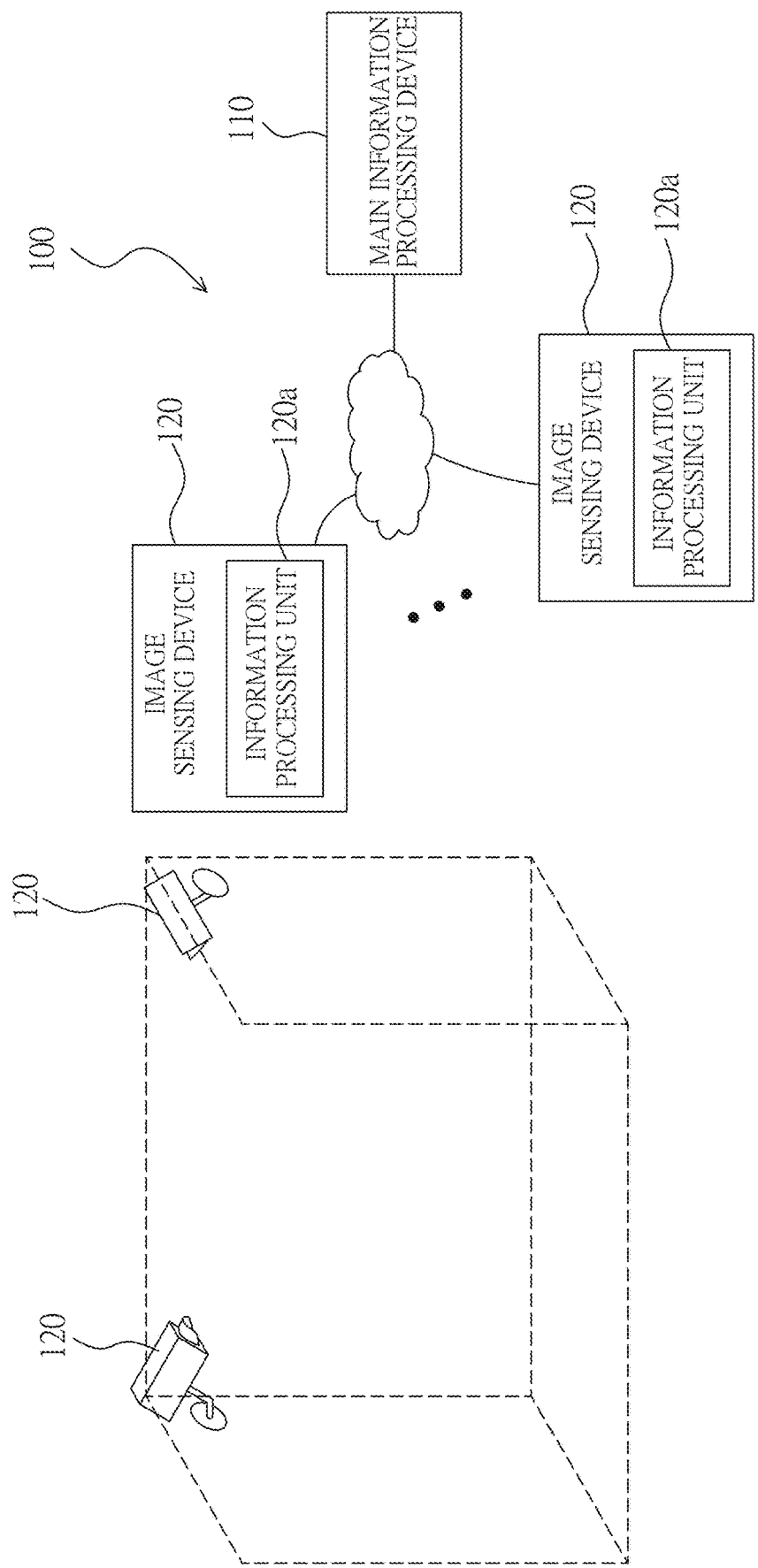
FIG. 2 illustrates a system applying the method of FIG. 1, where the system has an edge computing architecture, and the edge computing architecture includes a main information processing device and a plurality of information processing units respectively disposed in a plurality of image sensing devices distributed in a space to enable the image sensing devices to cooperatively detect at least one object.
Figure 3:
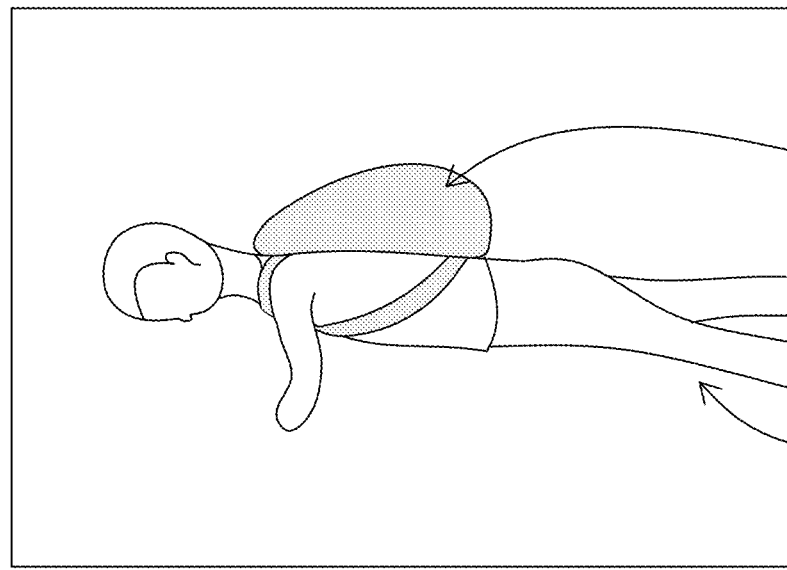
FIG. 3 illustrates a scenario that an image sensing device shown in FIG. 2 detects an attribute vector corresponding to a man wearing a backpack at a time point.
Figure 4:
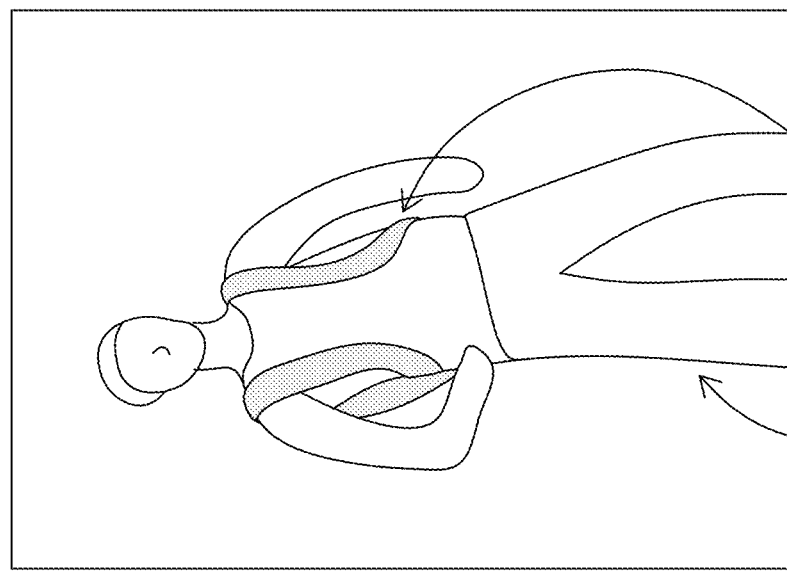
FIG. 4 illustrates a scenario that another image sensing device shown in FIG. 2 detects another attribute vector corresponding to the man wearing the backpack at the same time point as opposed to the attribute vector detected by the image sensing device mentioned in FIG. 3.
Figure 5:
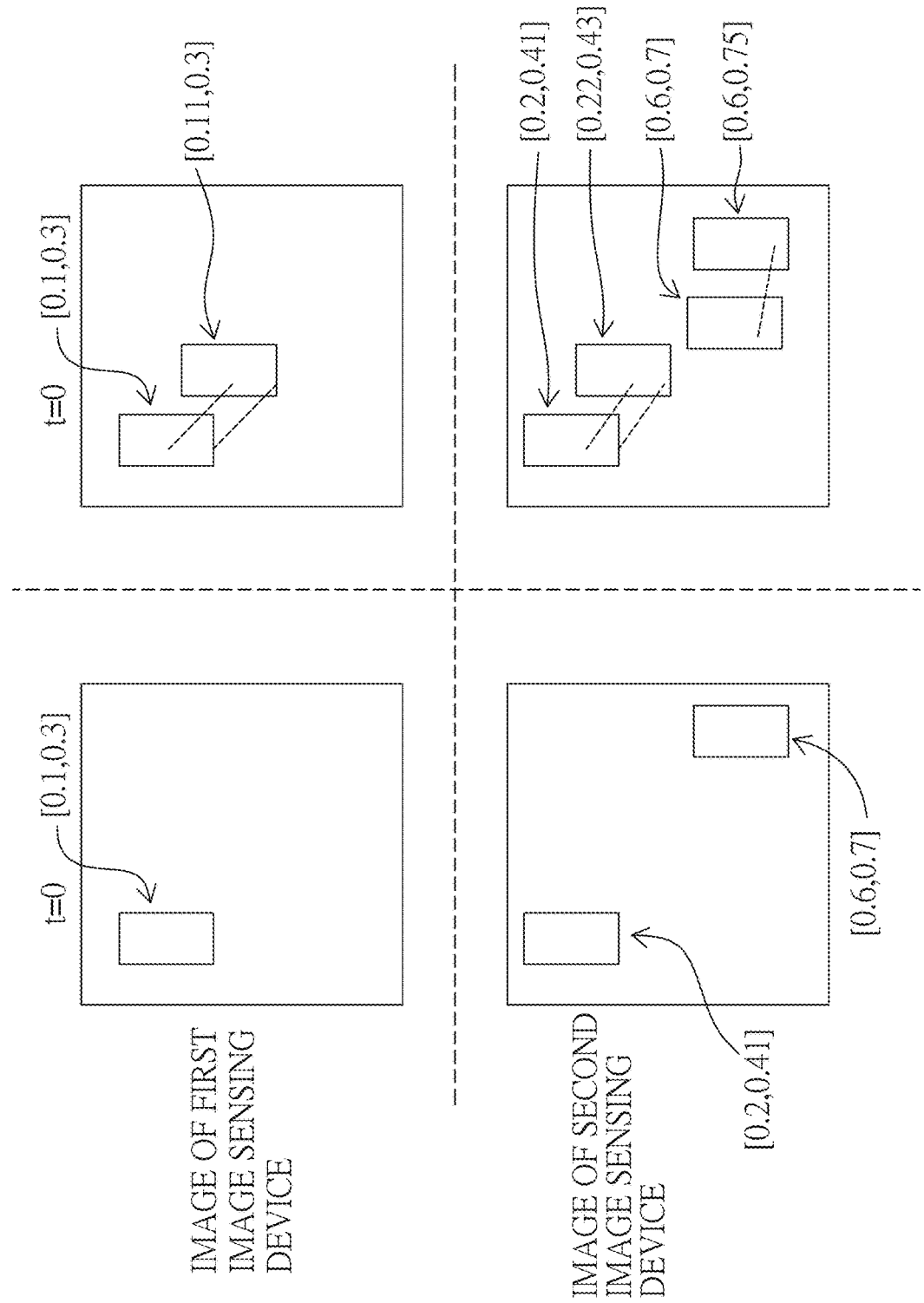
FIG. 5 illustrates a variation of the attribute vectors detected on respective image planes of two image sensing devices at two time points.

Please refer to FIGS. 1-5, in which, FIG. 1 illustrates a flowchart of an embodiment of a cross-sensor object-attribute analysis method of the present invention; FIG. 2 illustrates a system applying the method of FIG. 1, where the system has an edge computing architecture, and the edge computing architecture includes a main information processing device and a plurality of information processing units respectively disposed in a plurality of image sensing devices distributed in a space to enable the image sensing devices to cooperatively detect at least one object; FIG. 3 illustrates a scenario that an image sensing device shown in FIG. 2 detects an attribute vector corresponding to a man wearing a backpack at a time point; FIG. 4 illustrates a scenario that another image sensing device shown in FIG. 2 detects another attribute vector corresponding to the man wearing the backpack at the same time point as opposed to the attribute vector detected by the image sensing device mentioned in FIG. 3; and FIG. 5 illustrates a variation of the attribute vectors detected on respective image planes of two image sensing devices at two time points.

As shown in FIG. 1, the method includes the following steps: installing an edge computing architecture in a space, the edge computing architecture including a main information processing device and a plurality of information processing units respectively disposed in the image sensing devices to enable the image sensing devices to cooperatively detect at least one object (step a); the information processing units transmitting detected data to the main information processing device, the detected data being raw data of sensed multiple images of the image sensing devices or data of one or more attribute vectors generated by processing the raw data using an inference process, and the main information processing device using the one or more attribute vectors to correspond to the at least one object, where each of the image sensing devices has an image plane, and the raw data and each of the attribute vectors all correspond to a time record, the inference process including: performing an object recognition procedure on the raw data to define a bounding box for at least one of the at least one object; and using a first AI module to perform an attribute evaluation calculation on each of one or more of the bounding boxes to generate one or more of the attribute vectors corresponding to one or more of the objects appearing in one of the images at a time point (step b); and the main information processing device performing the inference process on the raw data of the images provided by the information processing units to generate one or more of the attribute vectors, and using each of the attribute vectors to correspond to one of the at least one object, or the main information processing device directly using the one or more of the attribute vectors provided by the information processing units to correspond to the at least one object (step c).

In step a, the information processing units may have at least one hardware acceleration unit, and the object may be a human, an animal, a plant, or an article.

In step b, the first AI module is obtained by performing a deep learning process or a training process using a pre-prepared (bounding box shape, attribute vector values) database, where the bounding box shape and the attribute vector values are input and output for the first AI module respectively, and the attribute vector may include information of a location of one of the at least one object in the space.

In step c, the main information processing device uses a second AI module to determine a corresponding identity of one of the attribute vectors, and the second AI module is obtained by performing a deep learning process or a training process using a pre-prepared (attribute vector values, corresponding identity) database, where the attribute vector values and the corresponding identity are input and output for the second AI module respectively.

In addition, the main information processing device uses one aforementioned corresponding identity to find corresponding ones of the attribute vectors detected by the image sensing devices at a plurality of time points, and thereby locate a trajectory of one of the at least one object in the space.

As shown in FIG. 2, the system of the present invention has an edge computing architecture 100, which includes a main information processing device 110 and a plurality of image sensing devices 120 arranged in a space, for performing the aforementioned method to make the image sensing devices 120 cooperatively detect at least one object, where the main information processing device 110 can be a cloud server, a local server or a computer device, each image sensing device 120 has an information processing unit 120a, and each information processing unit 120a communicates with the main information processing device 110 via a wired or wireless network.

When in operation, the edge computing architecture 100 will perform the following steps:

(1) The information processing units 120a transmit detected data to the main information processing device 110, the detected data being raw data of sensed multiple images of the image sensing devices 120 or data of one or more attribute vectors generated by processing the raw data using the aforementioned inference process, and the main information processing device 110 uses the one or more attribute vectors to correspond to the at least one object, where each of the image sensing devices 120 has an image plane, the raw data and each of the attribute vectors all correspond to a time record, and the inference process includes: performing an object recognition procedure on the raw data to define a bounding box for at least one of the at least one object; and using a first AI module to perform an attribute evaluation calculation on each of one or more of the bounding boxes to generate one or more of the attribute vectors corresponding to one or more of the objects appearing in one of the images at a time point;

(2) The main information processing device 110 performs the inference process on the raw data of the images provided by the information processing units 120a to generate one or more of the attribute vectors, and uses each of the attribute vectors to correspond to one of the at least one object; or the main information processing device 110 directly uses the one or more attribute vectors provided by the information processing units 120a to correspond to the at least one object;

(3) The main information processing device 110 uses a second AI module to determine a corresponding identity of one of the attribute vectors; and (4) The main information processing device 110 uses one aforementioned corresponding identity to find corresponding ones of the attribute vectors detected by the image sensing devices at a plurality of time points, and thereby locate a trajectory of one of the at least one object in the space.

In a practical application, as shown in FIG. 3, an image sensing device 120 detects that a man wearing a backpack has an attribute vector [0.3, 0.7, 0.2] at a time point, in which the first two elements (0.3, 0.7) are obtained by using the first AI module to process the bounding box shape of the front view of the backpack man's body, and the third element 0.2 is obtained by using the first AI module to process the bounding box shape of the backpack's straps; and, as shown in FIG. 4, the backpack man detected by another image sensing device 120 at the same time point has another attribute vector [0.35, 0.8, 0.8], where the first two elements (0.35, 0.8) are obtained by using the first AI module to process the bounding box shape of a side view of the backpack man, and the third element 0.8 is obtained by using the first AI module to process the bounding box shape of a side view of the backpack. The two attribute vectors [0.3, 0.7, 0.2], [0.35, 0.8, 0.8] obtained by two image sensing devices 120 at a same time point for the backpack man will be determined as corresponding to a same identity.

In another practical application, as shown in FIG. 5, at time t=0, the attribute vector of a first object detected by a first image sensing device 120 on its image plane is [0.1, 0.3], and the attribute vectors of a second object and a third object detected by a second image sensing device 120 on its image plane are [0.2, 0.41] and [0.6, 0.7] respectively; and at time t=1, the attribute vector of a fourth object detected by the first image sensing device 120 on its image plane is [0.11, 0.3], and the attribute vectors of a fifth object and a sixth object detected by the second image sensing device 120 on its image plane are [0.22, 0.43] and [0.6, 0.75] respectively. Similarly, the attribute vector [0.1, 0.3] of the first object and the attribute vector [0.11, 0.3] of the fourth object will be determined to correspond to a same identity after being processed by the second AI module; the attribute vector [0.2, 0.41] of the second object and the attribute vector [0.22, 0.43] of the fifth object will be determined to correspond to a same identity after being processed by the second AI module; and the attribute vector [0.6, 0.7] of the third object and the attribute vector [0.6, 0.75] of the sixth object will be determined to correspond to a same identity after being processed by the second AI module. Accordingly, the present invention can quickly define the identity of each object in a space and track its trajectory so as to provide consumer information to assist an owner of the space in making business decisions, where the consumer information can be derived by analyzing the trajectory record of each object in the space.

Thanks to the proposals disclosed above, the present invention possesses the following advantages:

(1) The cross-sensor object-attribute analysis method of the present invention can cover a space in a partially overlapping manner by the images of a plurality of image sensing devices, and use an edge computing architecture to implement at least one AI module to process the images obtained at a same time point to determine the identity of at least one object in the space.

(2) The cross-sensor object-attribute analysis method of the present invention can determine two different attribute vectors correspond to a same object when a difference value of the two different attribute vectors is less than a preset value.

(3) The cross-sensor object-attribute analysis method of the present invention can quickly identify an object and track its trajectory by disposing a plurality of image sensing devices in a space and adopting the corresponding manner between the attribute vectors and the object proposed by the present invention.

(4) The cross-sensor object-attribute analysis method of the present invention can analyze the trajectory record of an object in a space to provide consumer information to assist the owner in making business decisions.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A cross-sensor object-attribute analysis method, which is applied in a space disposed with a plurality of image sensing devices to enable the image sensing devices to cooperatively detect at least one object, and is realized by an edge computing architecture, the edge computing architecture including a main information processing device and a plurality of information processing units respectively disposed in the image sensing devices, the method including:
the plurality of information processing units transmitting detected data to the main information processing device, the detected data being raw data of sensed multiple images of the image sensing devices or data of one or more attribute vectors generated by processing the raw data using an inference process, and the main information processing device using the one or more attribute vectors to correspond to the at least one object, where each of the image sensing devices has an image plane, and the raw data and each of the attribute vectors all correspond to a time record, the inference process including: performing an object recognition procedure on the raw data to define a bounding box for at least one of the at least one object; and using a first artificial intelligence (AI) module to perform an attribute evaluation calculation on each of one or more of the bounding boxes to generate one or more of the attribute vectors corresponding to one or more of the objects appearing in one of the images at a time point; and
the main information processing device performing the inference process on the raw data of the images provided by the plurality of information processing units to generate one or more of the attribute vectors, and using each of the attribute vectors to correspond to one of the at least one object, or the main information processing device directly using the one or more of the attribute vectors provided by the plurality of information processing units to correspond to the at least one subject.

2. The cross-sensor object-attribute analysis method as disclosed in claim 1, wherein the plurality of information processing units have at least one hardware acceleration unit.

3. The cross-sensor object-attribute analysis method as disclosed in claim 1, wherein the main information processing device uses a second AI module to determine a corresponding identity of one of the attribute vectors.

4. The cross-sensor object-attribute analysis method as disclosed in claim 3, wherein the main information processing device uses one said corresponding identity to find corresponding ones of the attribute vectors detected by the image sensing devices at a plurality of time points to locate a trajectory of one of the at least one object in the space.

5. The cross-sensor object-attribute analysis method as disclosed in claim 1, wherein the attribute vector includes information of a location of one of the at least one object in the space.

6. A cross-sensor object-attribute analysis system, which has an edge computing architecture to realize a cross-sensor object-attribute analysis method to enable a plurality of image sensing devices to cooperatively detect at least one object, the edge computing architecture including a main information processing device and a plurality of information processing units respectively disposed in the image sensing devices, and the method including:
the plurality of information processing units transmitting detected data to the main information processing device, the detected data being raw data of sensed multiple images of the image sensing devices or data of one or more attribute vectors generated by processing the raw data using an inference process, and the main information processing device using the one or more attribute vectors to correspond to the at least one object, where each of the image sensing devices has an image plane, and the raw data and each of the attribute vectors all correspond to a time record, the inference process including: performing an object recognition procedure on the raw data to define a bounding box for at least one of the at least one object; and using a first artificial intelligence (AI) module to perform an attribute evaluation calculation on each of one or more of the bounding boxes to generate one or more of the attribute vectors corresponding to one or more of the objects appearing in one of the images at a time point; and
the main information processing device performing the inference process on the raw data of the images provided by the plurality of information processing units to generate one or more of the attribute vectors, and using each of the attribute vectors to correspond to one of the at least one object, or the main information processing device directly using the one or more of the attribute vectors provided by the plurality of information processing units to correspond to the at least one object.

7. The cross-sensor object-attribute analysis system as disclosed in claim 6, wherein the plurality of information processing units have at least one hardware acceleration unit.

8. The cross-sensor object-attribute analysis system as disclosed in claim 7, wherein the main information processing device is selected from a group consisting of a cloud server, a local server and a computer device.

9. The cross-sensor object-attribute analysis system as disclosed in claim 8, wherein the image sensing devices communicate with the main information processing device in a wired or wireless manner.

10. The cross-sensor object-attribute analysis system as disclosed in claim 6, wherein the main information processing device uses a second AI module to determine a corresponding identity of one of the attribute vectors.

11. The cross-sensor object-attribute analysis system as disclosed in claim 10, wherein the main information processing device uses one said corresponding identity to find corresponding ones of the attribute vectors detected by the image sensing devices at a plurality of time points, and thereby locate a trajectory of one of the at least one object in the space.

12. The cross-sensor object-attribute analysis system as disclosed in claim 11, wherein the main information processing device is selected from a group consisting of a cloud server, a local server and a computer device.

13. The cross-sensor object-attribute analysis system as disclosed in claim 12, wherein the image sensing devices communicate with the main information processing device in a wired or wireless manner.

14. The cross-sensor object-attribute analysis system as disclosed in claim 10, wherein the main information processing device is selected from a group consisting of a cloud server, a local server and a computer device.

15. The cross-sensor object-attribute analysis system as disclosed in claim 14, wherein the image sensing devices communicate with the main information processing device in a wired or wireless manner.

16. The cross-sensor object-attribute analysis system as disclosed in claim 6, wherein the attribute vector includes information of a location of one of the at least one object in the space.

17. The cross-sensor object-attribute analysis system as disclosed in claim 16, wherein the main information processing device is selected from a group consisting of a cloud server, a local server and a computer device.

18. The cross-sensor object-attribute analysis system as disclosed in claim 17, wherein the image sensing devices communicate with the main information processing device in a wired or wireless manner.

19. The cross-sensor object-attribute analysis system as disclosed in claim 6, wherein the main information processing device is selected from a group consisting of a cloud server, a local server and a computer device.

20. The cross-sensor object-attribute analysis system as disclosed in claim 19, wherein the image sensing devices communicate with the main information processing device in a wired or wireless manner.

\* \* \* \* \*